(12) United States Patent
Wilhelm et al.

(10) Patent No.: US 11,753,710 B2
(45) Date of Patent: Sep. 12, 2023

(54) METHOD OF MANUFACTURING A SENSOR ELEMENT FOR A POTENTIOMETRIC SENSOR

(71) Applicant: Endress+Hauser Conducta GmbH+Co. KG, Gerlingen (DE)

(72) Inventors: Thomas Wilhelm, Chemnitz (DE); Matthäus Speck, Göpfersdorf (DE)

(73) Assignee: Endress+Hauser Conducta GmbH+Co. KG, Gerlingen (DE)

(*) Notice: Subject to any disclaimer, the term of this patent is extended or adjusted under 35 U.S.C. 154(b) by 68 days.

(21) Appl. No.: 16/996,546

(22) Filed: Aug. 18, 2020

(65) Prior Publication Data
US 2021/0054493 A1    Feb. 25, 2021

(30) Foreign Application Priority Data

Aug. 21, 2019 (DE) ..................... 10 2019 122 519.1
Aug. 21, 2019 (DE) ..................... 10 2019 122 520.5
Dec. 6, 2019 (DE) ..................... 10 2019 133 453.5

(51) Int. Cl.
| | |
|---|---|
| *C23C 4/11* | (2016.01) |
| *C23C 4/129* | (2016.01) |
| *C23C 4/134* | (2016.01) |
| *G01N 27/36* | (2006.01) |
| *G01N 27/333* | (2006.01) |

(52) U.S. Cl.
CPC ................ *C23C 4/11* (2016.01); *C23C 4/129* (2016.01); *C23C 4/134* (2016.01); *G01N 27/333* (2013.01); *G01N 27/36* (2013.01)

(58) Field of Classification Search
CPC ........... C23C 4/11; C23C 4/129; C23C 4/134; C23C 4/04; C23C 4/126; C23C 4/18; G01N 27/333; G01N 27/36; G01N 27/302; C23D 5/04
See application file for complete search history.

(56) References Cited

U.S. PATENT DOCUMENTS

| | | | |
|---|---|---|---|
| 3,458,422 A | 7/1969 | Proctor, Jr. | |
| 4,133,735 A * | 1/1979 | Afromowitz | .......... G01N 27/36 |
| | | | 204/406 |
| 2006/0148118 A1 | 7/2006 | Hsiung et al. | |
| 2017/0073278 A1 * | 3/2017 | Landwehr | ............... F01D 5/284 |

FOREIGN PATENT DOCUMENTS

| | | | |
|---|---|---|---|
| CN | 103703865 A | 4/2014 | |
| CN | 109655511 A | 4/2019 | |
| DE | 10018750 A1 * | 1/2001 | ............ G01N 27/36 |
| GB | 1547530 A | 6/1979 | |
| JP | 63262453 A | 10/1988 | |
| WO | 2018069491 A1 | 4/2018 | |

* cited by examiner

*Primary Examiner* — Dah-Wei D. Yuan
*Assistant Examiner* — Nga Leung V Law
(74) *Attorney, Agent, or Firm* — Christopher R. Powers; Endress+Hauser (USA) Holding, Inc.

(57) ABSTRACT

The present disclosure relates to a method of manufacturing an ion-selective sensor element for a potentiometric sensor, the sensor element having a sensor element body and at least one glass layer arranged on the sensor element body, the method comprising applying the at least one glass layer to the sensor element body by means of a thermal spraying method, in which a powder of glass particles is sprayed onto the sensor element body.

16 Claims, 3 Drawing Sheets

METHOD OF MANUFACTURING A SENSOR ELEMENT FOR A POTENTIOMETRIC SENSOR

CROSS-REFERENCE TO RELATED APPLICATIONS

The present application is related to and claims the priority benefit of German Patent Application Nos. 10 2019 122 519.1, filed on Aug. 21, 2019, 10 2019 122 520.5, filed on Aug. 21, 2019, and 10 2019 133 453.5, filed on Dec. 6, 2019, the entire contents of which are incorporated herein by reference.

TECHNICAL FIELD

The present disclosure relates to a method of manufacturing a sensor element for a potentiometric sensor.

BACKGROUND

Potentiometric sensors are used in laboratory and process measurement technology in many areas of chemistry, biochemistry, pharmacy, biotechnology, food technology, water management, and environmental measurement technology for the analysis of measuring media, especially measuring liquids. Potentiometric sensors allow detection of activities of chemical substances, such as ion activities, and correlated measured variables in liquids. The substance, the activity or concentration of which is to be measured is also referred to as an analyte. The measuring medium can be a measuring liquid, such as an aqueous solution, emulsion, or suspension.

Potentiometric sensors generally comprise a measuring electrode and a reference electrode as well as a sensor circuit for detecting measured values and for signal processing. The measuring and reference electrodes can be combined in a measuring probe which can be immersed in the measuring liquid. This measuring probe may also comprise the sensor circuit or at least part of the sensor circuit. The measuring probe can be connected for communication to a higher-level unit, for example, a measuring transducer, an electronic operating device, a computer, or a controller, via a cable or wirelessly. The higher-level unit can be used for further processing the measurement signals or measured values detected by means of the measuring probe and for operating the measuring probe.

In contact with the measuring medium, the measuring electrode forms a potential that is a function of the activity of the analyte in the measuring medium, whereas the reference electrode provides a stable reference potential independent of the analyte concentration. The sensor circuit generates an analog or digital measurement signal which represents the electric voltage (potential difference) between the measuring electrode and the reference electrode and, consequently, the activity of the analyte in the measuring medium. The measurement signal may be output from the sensor circuit to the higher-level unit, which further processes the measurement signal. A partial or complete further processing of the measurement signal in the sensor circuit in the measuring probe is also possible.

The reference electrode of conventional potentiometric sensors is often designed as a second-type electrode, e.g., as a silver/silver chloride reference electrode, and is electrically conductively connected to the sensor circuit. It may comprise a housing and a reference element, e.g., a silver wire coated with silver chloride, which is arranged in the housing and which is in electrolytically conductive and/or ion-conducting contact with the measuring liquid in measuring operation via a reference electrolyte contained in the housing and an electrochemical bridge, e.g., a diaphragm.

The measuring electrode comprises a potential-forming sensor element which comprises an ion-selective membrane or layer, depending upon the type of the potentiometric sensor. Examples of such measuring electrodes are ion-selective electrodes (ISE). A traditional ion-selective electrode has a housing that is closed by the ion-selective membrane and accommodates an inner electrolyte that is in contact with the membrane. The ion-selective electrode also comprises a terminal lead, also called a potential lead, which is in contact with the inner electrolyte. The terminal lead is electrically conductively connected to the sensor circuit. If the ion-selective membrane for measuring is in contact with the measuring medium, the membrane selectively interacts with a specific ionic species contained in the measuring medium, namely with the analyte. Changing the activity or concentration of the ion in the measuring medium causes a relative change in the equilibrium galvanic voltage between the measuring medium and the terminal lead in contact with the ion-selective membrane via the inner electrolyte. A special case of such an ion-selective electrode, i.e., an electrode that selectively detects the hydronium ion activity in a measuring liquid, is the known pH glass electrode, which comprises a glass membrane as the potential-forming sensor element. The terms "ion-selective layer," "membrane," or "electrode" used here and hereinafter refer to an ion-sensitive layer, membrane, or electrode, the potential of which is preferably predominantly influenced by the analyte, e.g., a specific ion type or the pH value, wherein cross-sensitivities of the layer, membrane, or electrode for other types of ions are not excluded but are preferably low. An ion-selective glass is taken to mean a glass which is suitable for forming such an ion-selective layer, membrane or electrode. pH-selective glasses are correspondingly special ion-selective glasses which are suitable for the formation of a layer, membrane or electrode which is selective for hydronium ions.

It has long been attempted to improve the design of measuring electrodes of potentiometric sensors with the goal of saving costs, simplifying manufacture, and greater robustness and longer service life. One approach that has been picked up again and again is the use of a solid terminal lead, which does not require an inner electrolyte contacting the ion-selective membrane. A "solid terminal lead" is understood to mean a potential lead in which the sensor element body is directly contacted by means of an electrical conductor, especially an electron- and/or ion-conducting solid body.

An ion-selective electrode with a solid terminal lead (also referred to as fixed contact electrode) is described in WO 2018/069491 A1. This electrode comprises a measuring element with an ion-selective layer which, during operation, is in contact with a measuring medium and is conductive for lithium ions. Furthermore, the measuring element has an electrically conductive layer which comprises metallic lithium, a lithium-(0) alloy, or an electrically conductive lithium compound. The measuring element also comprises a solid electrolyte layer, which is arranged between the ion-selective layer and the electrically conductive layer. The measuring element comprises a series of further layers which serve to protect the lithium-containing conductive layer from oxygen or moisture and to contact the ion-selective layer. The manufacture of the sensor element therefore requires a series of individual steps for constructing the layer stack and is correspondingly complex.

Some other approaches for providing electrodes with a solid terminal lead are described in the textbook H. Galster, "pH-Messung—Grundlagen, Methoden, Anwendungen, Geräte" [pH Measurement—Fundamentals, Methods, Applications, Devices], VCH Verlagsgesellschaft mbH, Weinheim, 1990, pp. 135-136. One of these approaches is formed by what are called enamel electrodes, which are typically constructed from a plurality of layers of different composition, the uppermost layer being formed from a pH-selective glass layer produced as an enamel layer.

Enamel electrodes are characterized by high mechanical stability and can be hygienically designed by providing an enamel coating covering all parts of the probe coming into contact with the process. They can therefore be used especially advantageously in processes of the food industry and in chemical processes in which frequent purifications are to be carried out.

Two examples of enamel electrodes are given in the aforementioned textbook by H. Galster. In a first example, an insulation enamel layer is arranged on an iron substrate, a silver layer is arranged on the insulation enamel layer, and a pH-selective enamel layer is arranged on the silver layer. The silver layer serves as the solid electrical terminal lead in this example. In a second example, a Pt/Pd layer is applied to a ceramic substrate of forsterite, an adhesive oxide layer of CuO/FeO is applied thereover, and a pH-selective enamel layer of MacInnes glass is applied thereover. The individual layers are applied by means of thick film technology. The final ion-selective layer is applied according to the screen-printing process. A paste of ground MacInnes glass with a suitable binder is used for this purpose and is subsequently baked at 850° C.

Like the ion-selective enamel layer, additional insulation enamel layers, such as those mentioned by Galster, can also be produced by applying an enamel preparation (also referred to as slip) containing glass particles of an insulating glass and a binder, and subsequently firing it.

The manufacture of these sensor elements known from the prior art for potentiometric sensors is relatively complex and requires some or even a plurality of individual manufacturing steps. In the case of the production of ion-selective or insulating glass layers by means of enameling processes, the required firing of the applied slip also results in thermal loading of the remaining components of the sensor element, e.g. of the layers lying under the enamel layer to be formed. This limits the choice of material for the sensor element and/or increases rejection of sensor elements manufactured in serial production using such production methods.

SUMMARY

Therefore, the object of the present disclosure is to provide a simple and safe manufacturing method for a sensor element with a solid terminal lead for a potentiometric sensor.

This object is achieved by the method according to claim 1. Advantageous embodiments are listed in the dependent claims.

The method according to the present disclosure for manufacturing an ion-selective sensor element having a sensor element body and at least one glass layer arranged on the sensor element body comprises applying the at least one glass layer to the sensor element body by means of a thermal spraying method in which a powder of glass particles is sprayed onto the sensor element body.

In the manufacture of a glass layer by means of a thermal spraying method, glass particles are sprayed onto the surface to be coated and form the desired glass layer there. Because the at least one glass layer is not produced by conventional enameling processes, which typically require a plurality of steps, but by the disclosed thermal spraying method, the number of manufacturing steps required is reduced. When the thermal spraying method is used, the manufacture of an enamel slip which contains the glass particles used for forming the glass layer by enameling as well as a binder and optionally further additives is eliminated. This not only simplifies the manufacturing process in comparison with conventional enameling processes, but also has the further advantage that it is ensured that the glass layer produced by the method according to the present disclosure is free of unwanted residues of the binder or other additives remaining in the glass layer.

In thermal spraying methods, the glass particles are melted or fused during application, e.g., in a flame or in a plasma, before they strike the surface to be coated. Thus, the thermal load on the coated surface and the entire sensor element is considerably reduced compared to a conventional enameling method with an additional firing step after the application of an enamel slip.

With the aid of suitable application methods and, where necessary, the use of masks when applying the glass layer, the method according to the present disclosure also allows complex geometries of sensor elements and/or glass layers to be realized. Thermal spraying methods allow uniform coating of even complex structures with a definable porosity and layer thickness, especially also in automated or partially automated series production of sensor elements.

The method according to the present disclosure makes it possible to produce glass layers with a sensing function, e.g., ion-selective glass layers, but also insulating glass layers, which are used, for example, for shielding electrical or electronic components from liquids or for mechanically stabilizing the sensor element.

The thermal spraying methods known from the prior art are frequently used for producing metal or ceramic layers. The applicability of high-velocity oxygen fuel spraying (HVOF) for producing silicate glass layers for corrosion protection is described in J. Zhan et al., Study on the corrosion mechanism of HVOF silicate glass coating in 36% HCl and 10 mol/L NaOH solution, Optoelectronics and Advanced Materials—Rapid Communications, Vol. 4, No. 8, August 2010, pp. 1170-1173.

In one possible embodiment, the at least one glass layer can be an ion-selective, especially pH-selective glass layer. In this case, a powder of glass particles of an ion-selective or pH-selective glass can be used in the method.

The sensor element body can have an electrically conductive surface region, with the at least one glass layer being applied directly to the electrically conductive surface region. The electrically conductive surface region can be, for example, a surface of an electrically conductive component of the sensor element body, e.g. an electrically conductive coating of the sensor element body. If the at least one glass layer is an ion-selective, especially pH-selective glass layer, the electrically conductive surface region can serve as a solid terminal lead of the sensor element. In a further embodiment, the sensor element body can consist substantially completely of an electrically conductive material.

The electrically conductive surface region may comprise, for example, a metal, a metal alloy, an electrically conductive ceramic, a carbon-based electrical conductor, e.g. graphite, glassy carbon or carbon fiber, an organic electrical conductor or an electrically conductive polymer. Since thermal energy input is low when the glass layer is produced by a thermal spraying method, the method according to the present disclosure also allows the use of thermally less stable materials, such as polymers or organic compounds, as terminal leads for a potential forming at the ion-selective glass layer.

In a further embodiment, the method of manufacturing the sensor element comprises applying a further glass layer to the sensor element body by means of a thermal spraying method such that the further glass layer covers at least one edge region of the at least one glass layer and a surface region of the sensor element body adjoining the edge region. Such a further glass layer serves as a casing and protective layer against penetration by liquid through the interface between the ion-selective glass layer and the sensor element body. The glass used here can be an insulating, non-ion-selective glass.

In an alternative embodiment of the method, the sensor element can have an ion-selective, especially pH-selective layer covering an electrically conductive surface region of the sensor element body, wherein the at least one glass layer applied by means of the thermal spraying method is a layer of an electrically insulating glass. Such a layer can insulate, for example, an edge region of the ion-selective layer with sensing function of the sensor element. Such a layer can also be an insulating coating for electrically conductive regions of the sensor element or for contact points and interfaces between parts of the sensor element. The ion-selective layer can but need not necessarily be applied to the sensor element body by means of a thermal spraying method.

For all embodiments described here, flame spraying, wire arc spraying, detonation spraying, laser spraying or plasma spraying are possible as thermal spraying methods. For example, it is possible to use one of the following methods: atmospheric plasma spraying (APS), vacuum plasma spraying (VPS) or high-velocity oxygen fuel spraying (HVOF).

In order to produce certain desired geometries of the glass layer, a partial region of a surface of the sensor element body can be covered by means of a mask during the application of the glass layer.

Optionally, the glass layer can be thermally treated after application, especially at a temperature between 400 and 1000° C.

The present disclosure also comprises a sensor element manufactured by the method according to one of the above-described embodiments. The glass layer of the sensor element applied by means of the thermal spraying method has a microscopic structure which differs from that of a glass layer applied by melting, glazing or enameling. As a result of the melting of the glass particles in the jet and the action of forces on the particles when they strike the surface, the glass layer produced can have, for example, isolated flattened or lamellar zones of homogeneous vitreous composition, between which grain boundaries and/or pores are formed. These can be seen, for example, on scanning electron microscope images. The volume ratio of pores to glass is advantageously less than 5% in the layer produced.

As mentioned above, the sensor element can have an ion-selective, especially pH-selective glass layer. This can be applied to the sensor element body of the sensor element by means of a thermal spraying method. In this embodiment, the sensor element is suitable for use as a measuring electrode in a potentiometric sensor for measuring an ion concentration or pH value.

In an advantageous embodiment, the sensor element comprises a preamplifier and/or an impedance transformer which can be connected to a potentiometric sensor circuit. One input of the preamplifier can be connected to the electrically conductive potential terminal lead of the sensor element, e.g. the already mentioned electrically conductive surface of the sensor element body, which contacts the ion-selective, especially pH-selective glass layer; a second input can be at a housing potential or at a virtual ground of the sensor circuit as reference potential. For example, if the sensor element is a component of a potentiometric sensor, e.g., a pH sensor, in which it serves as a measuring electrode and which furthermore has a reference electrode and a sensor circuit, which is configured to detect a voltage between the measuring electrode and the reference electrode and to generate a measurement signal as a function of this voltage, the preamplifier or impedance transformer can serve to increase the signal-to-noise ratio of the measurement signals. This is especially advantageous if the ion-selective layer has a high impedance.

The preamplifier can be arranged in a cavity within the sensor element body or in a housing which at least partially surrounds the sensor element body or a sheath which at least partially surrounds the sensor element body, which can be formed, for example, as a glass layer made of an electrically insulating glass.

The present disclosure also relates to a method of manufacturing a potentiometric sensor, e.g., a pH sensor, comprising: manufacturing an ion-selective, especially pH-selective sensor element by means of the method according to one of the above-described embodiments, wherein the sensor element has an ion-selective, especially pH-selective layer and a solid terminal lead contacting the ion-selective, especially pH-selective layer; connecting the solid terminal lead to a sensor circuit; and connecting a reference electrode to the sensor circuit, wherein the sensor circuit is configured to detect a voltage between the solid terminal lead and the reference electrode and to output a measurement signal that depends on the detected voltage.

The solid terminal lead is used to dissipate a potential forming at the ion-selective layer which is in contact with a measuring medium and can comprise an electron- and/or ion-conducting solid, for example in the form of a layer, a strip conductor and/or a wire. The solid terminal lead can be configured as an electrically conductive surface region of a sensor element body of the sensor element or contact the electrically conductive surface region.

The solid terminal lead can be connected to the sensor circuit via a preamplifier or impedance transformer arranged on or in the sensor element.

The present disclosure also comprises a potentiometric sensor, e.g., for pH measurement or for measuring the concentration of a specific type of ion, with a sensor element according to one of the embodiments described above. The sensor element can be manufactured according to the method described here. The potentiometric sensor can be manufactured according to the above-mentioned method of manufacturing a potentiometric sensor.

BRIEF DESCRIPTION OF THE DRAWINGS

The present disclosure is explained in further detail below on the basis of the exemplary embodiments shown in the figures.

The following are shown.

DETAILED DESCRIPTION

Figure 1:
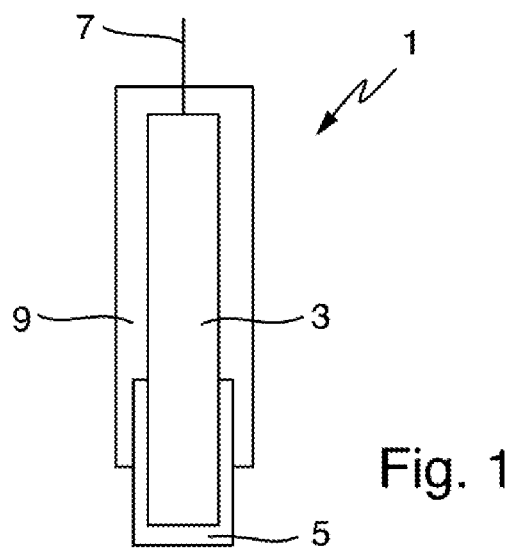
FIG. 1 shows a schematic longitudinal sectional view of a sensor element for a potentiometric sensor according to a first exemplary embodiment.

FIG. 1 schematically shows a sensor element 1 for a potentiometric sensor according to a first exemplary embodiment in a longitudinal section. The sensor element 1 has a sensor element body 3 in the form of a rod-shaped electrically conductive body. In the present example, the conductive body is made of a metal or a metal alloy. An ion-selective glass layer 5 is arranged in a front end region of the sensor element body 3. In the present example, this glass layer 5 consists of an ion-selective glass, e.g., of a sodium- or pH-selective glass, e.g., MacInnes glass, Corning 015 glass, or any of the glasses known from U.S. Pat. No. 3,458,422. The glasses mentioned in U.S. Pat. No. 3,458,422 contain a proportion of $Li_2O$ and are free of $Na_2O$ so that the cross-sensitivity of pH measurements with a sensor layer of one of these glasses is reduced. The ion-selective glass layer 5 is intended to be brought into contact with a measuring medium to potentiometrically determine activity in the measuring medium of the ion species for which the glass layer 5 is selective. In the present case, the type of ion is the hydronium ion. In alternative embodiments, a glass which is selective for other ions, for example a sodium- or potassium-selective glass, can also be used. A voltage measured via the contact point 7 between the sensor element 3 and a reference electrode at a stable potential that is also in contact with the measuring medium is a measure of the ion activity and, to a good approximation, also of the ion concentration in the measuring medium. If the ion-selective glass layer 5 is formed from a pH-selective glass as here, this voltage is accordingly a factor for the pH of the measured medium.

The sensor element 1 moreover has a sheath 9 which is formed of an electrically insulating glass layer in the present example. Alternatively, the sheath may also be formed from a polymer. It closely surrounds the sensor element body 3 and an edge region of the ion-selective glass layer 5, so that no liquid, especially no measuring medium in which the sensor element 1 is immersed for measurement, reaches the electrically conductive sensor body 3.

In the present example, the ion-selective glass layer 5 is applied to the sensor element body 3 by a thermal spraying method. The method is described below with reference to the schematic diagram shown in FIG. 2. The sketch shows a sensor element body 3 which has an electrically conductive surface 11 which is configured here as a layer of a metal or a metal alloy on a base body, e.g. made of a plastic or a ceramic. A glass layer 5 made of an ion-selective or pH-selective glass can be applied to the surface 11 of the sensor element body 3 by means of the thermal spraying method. For this purpose, a powder of particles of the ion-selective glass supplied via the supply line 15 is heated in a burner 13, at least partially melted and atomized in a jet 17 with the aid of process gases supplied via the line 14 and sprayed onto the surface 11. The molten, liquid or dough-like particles solidify there and form a closed layer of the ion-selective glass.

Optionally, in a preliminary step, the surface 11 to be coated can be pretreated, for example cleaned, roughened or oxidized or passivated in order to ensure better adhesion of the ion-selective layer 5. Oxidation or passivation of the surface to be coated can be achieved by thermal treatment, treatment in a plasma, e.g. an oxygen plasma, sputtering or vapor deposition.

Masks can be used to create a particular geometry of the ion-selective layer 5. In the present example, a region of the electrically conductive surface 11 is shielded by means of the mask 19 during the application of the ion-selective layer 5. This region 21 of the surface 11 that remains uncovered due to the shielding can be used for electrically contacting the electrically conductive surface 11.

Atmospheric plasma spraying, for example, in which high thermal energies are reached in the plasma jet, can be considered as a suitable thermal spraying method.

Instead of a metal or metal alloy layer, the electrically conductive surface can also be formed by an electrically conductive polymer, an electrically conductive ceramic, a conductive layer based on carbon or an electrically conductive organic compound. Since the heat input into the coated surface during thermal spraying is low, materials less thermally stable than metals or ceramics can also be used. The electrically conductive surface 11 acts as a solid terminal lead for the sensor element manufactured by means of the method described here, dissipating a potential forming at the ion-selective glass layer 5 in contact with a measuring medium. The electrically conductive surface need not necessarily be formed by a coating of the sensor element body 3. In an alternative embodiment, the electrically conductive surface can be an uncoated surface of a sensor element body which consists of an electrically conductive material, such as the sensor element body 3 illustrated in FIG. 1. In this case, the sensor element body 3 itself serves as a solid terminal lead.

The sheath 9 of the sensor element 1 shown in FIG. 1 can also be produced completely analogously to the ion-selective glass layer 5 by applying a glass layer by thermal spraying. However, it can also be produced from a polymer or a ceramic, for example by means of an injection molding process. It is also possible for the sheath 9 to be produced by fusing a glass or by conventional glazing or enameling processes.

In a further alternative embodiment, the ion-selective layer 5 can be applied to the electrically conductive surface region of the sensor element body 3 by conventional methods, e.g. by glazing or enameling, while the sheath 9 is produced as a glass layer by a thermal spraying method.

Figure 3:
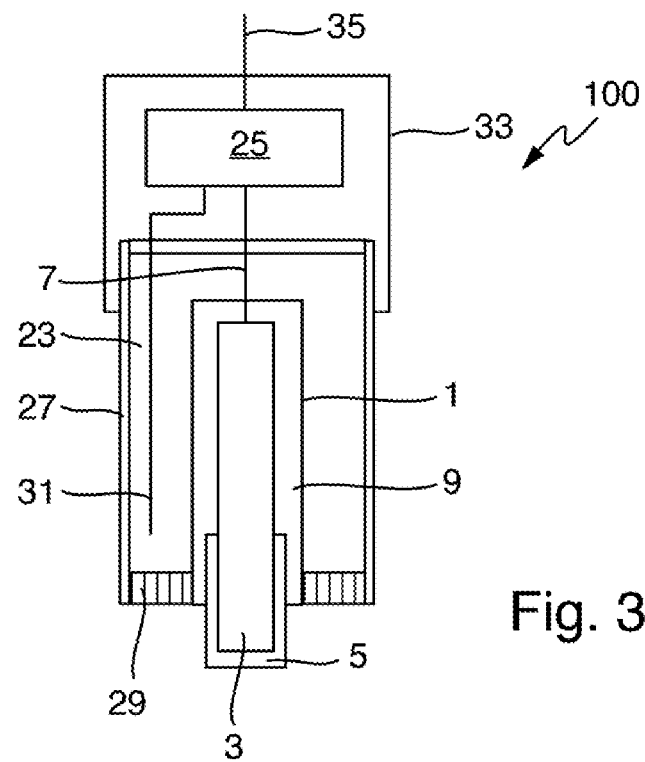
FIG. 3 shows a schematic longitudinal sectional view of a potentiometric sensor with the sensor element according to the first exemplary embodiment of FIG. 1.

FIG. 3 shows a schematic longitudinal sectional view of a potentiometric sensor 100 for measuring an activity or concentration of an analyte ion or a measured variable dependent thereon, e.g. a pH value, with the sensor element 1 shown in FIG. 1 as measuring electrode and a reference electrode 23.

As already described with reference to FIG. 1, the sensor element 1 has an electrically conductive sensor element body 3 which is formed from metal or a metal alloy and on which an ion-selective layer 5 is arranged in a front-side region intended for contact with a measuring medium. An edge region of the ion-selective layer 5 and the rear region of the sensor element body 3 are covered with a sheath 9 of an insulating glass. A contact 7 which connects the electrically conductive sensor element body 3 to a sensor circuit 25 in an electrically conductive manner is guided through the sheath 9. In the present example, the ion-selective layer 5 and the sheath 9 are embodied as glass layers which have been produced by means of a thermal spraying method.

The reference electrode 23 may be designed as a conventional electrode of the second type, e.g., as a silver/silver chloride electrode. In the example shown here, it comprises a tubular housing 27 which surrounds a section of the sensor element 1 in the region of the sheath 9 and which is closed at its front end facing the measuring medium by an annular diaphragm 29. The diaphragm 29 may be formed, for example, from a plastic, e.g., polytetrafluoroethylene (PTFE), or from a porous ceramic, e.g., a $ZrO_2$ ceramic. The annular chamber formed between the sheath 9 and the housing 27 contains a reference electrolyte, e.g., a KCl solution, in which a reference element 31, e.g. a silver electrode coated with silver chloride, is immersed. Instead of a diaphragm, the reference electrode 23 may also have another bridge which establishes an ion-conducting and/or an electrolytic contact between the reference electrolyte and the measuring medium. The annular chamber containing the reference electrolyte is closed on its rear side, e.g., by casting or adhesive bonding. The reference element 31 is electrically conductively connected to the sensor circuit 25 through the closed rear side of the reference electrode 23.

The sensor circuit 25 is arranged in an electronics housing 33 of the sensor 100 which is connected to the reference electrode 23 and the sensor element 1. It is configured to detect a voltage arising between the sensor element 1 and the reference electrode 23 when the diaphragm 29 and the ion-selective layer 5 are in contact with the measuring medium. This voltage depends on the activity of the analyte ion present on the ion-selective layer 5. The sensor circuit 25 may be configured to generate a measurement signal representing the detected voltage and to output it, e.g. to a measuring transducer which is connected to the sensor circuit 25 and processes the measurement signal, and to determine therefrom, using a predetermined calibration function, a measured value of the ion concentration of the analyte ion. If the analyte ion is the hydronium ion, the measured value can be determined as the pH value. The sensor circuit 25 may also be configured to determine the measured value and to output it via an interface 35 to a measuring transducer or another operating or display device.

Figure 4:
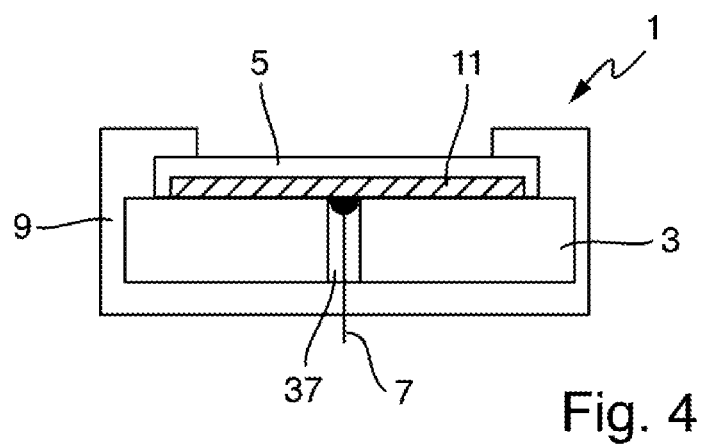
FIG. 4 shows a schematic longitudinal sectional view of a sensor element for a potentiometric sensor according to a second exemplary embodiment.

FIG. 4 schematically shows another exemplary embodiment of a sensor element 1 for a potentiometric sensor. This sensor element 1 has a sensor element body 3 made of a ceramic or glass ceramic, on which an electrically conductive layer formed from an electrical conductor, for example a metal such as silver or copper, is arranged. This layer forms an electrically conductive surface 11 of the sensor element body 3. It can be formed by a small plate bonded, adhesively bonded, or otherwise fastened to the ceramic or glass ceramic or by a foil. The layer may also be formed by a chemical or physical deposition method. A bore 37 is arranged in the sensor element body 3 via which the electrically conductive layer can be electrically contacted from the rear side of the sensor element 1 via the contact 7. The ceramic of the sensor element body 3 may, for example, be a zirconium oxide ceramic or an aluminum oxide ceramic.

Figure 2:
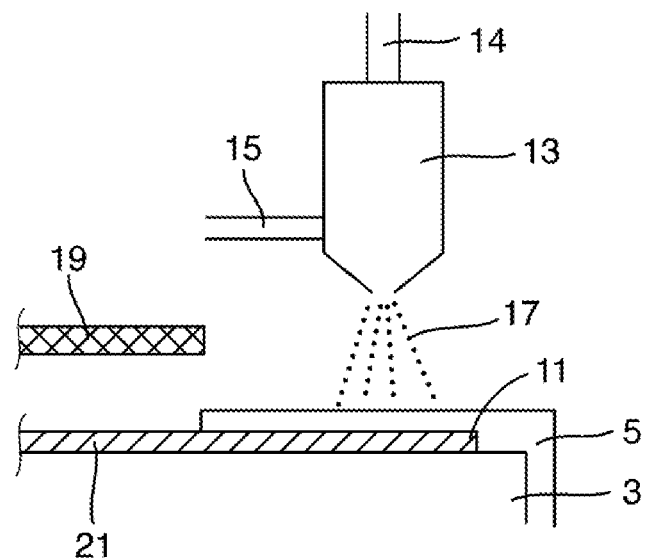
FIG. 2 shows a schematic illustration of a method for applying a glass layer to a conductive region of a sensor element body in order to manufacture a sensor element.

An ion-selective glass layer 5 made of an ion-selective glass and serving as a sensor layer, which is applied by means of a thermal spraying method as described with reference to FIG. 2, is arranged on the electrically conductive surface 11 of the sensor element body 3. The electrically conductive surface 11 contacts the ion-selective glass layer 5 as a solid terminal lead. It can be electrically conductively connected to a potentiometric sensor circuit, so that the sensor element 1 forms the measuring electrode of a potentiometric sensor. The unit formed from the sensor element body 3 and the ion-selective layer 5 is embedded in a sheath 9 made of glass, which also covers the edge regions of the ion-selective glass layer 5 and thus insulates the interfaces between the sensor element body 3 and the ion-selective glass layer 5 from a measuring medium.

A potentiometric sensor comprising the sensor element 1 shown here as a measuring electrode may have a reference electrode which is also formed by a layer stack and whose potential terminal lead is designed as a solid terminal lead. Both electrodes may be arranged on a common base body, e.g., a circuit board or an electrically insulating ceramic, e.g., a glass ceramic based on zirconium oxide or aluminum oxide, and be connected to a sensor circuit via electrical lines, e.g., strip conductors extending on the base body. In this way, a very compact potentiometric sensor may be realized.

In an alternative embodiment, the sensor element can comprise a preamplifier and/or an impedance transformer which serves to increase the signal-to-noise ratio of the measurement signal of the sensor element or of a potentiometric sensor with the sensor element. The integration of a preamplifier in the signal path close to the ion-selective glass layer 5 is especially advantageous if the glass layer 5 has a high impedance.

Figure 5:
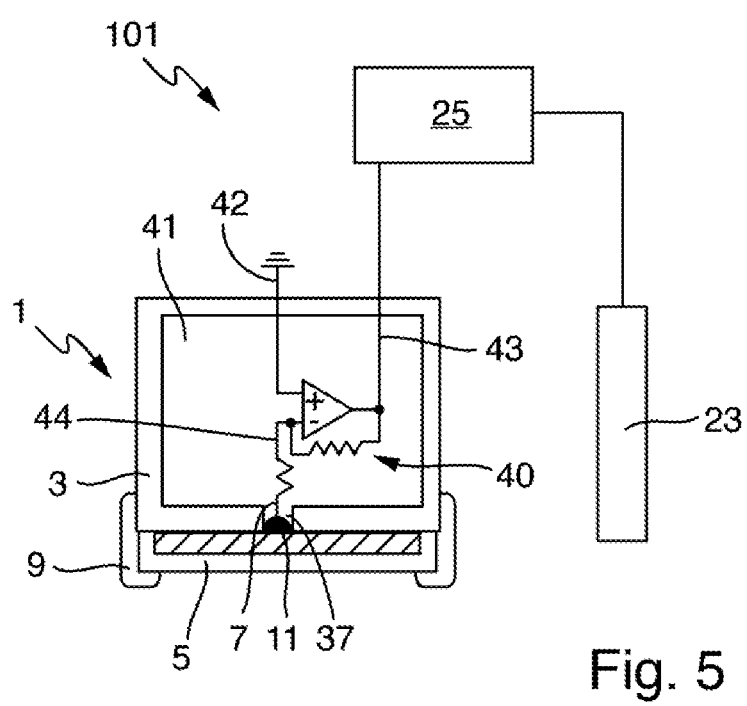
FIG. 5 shows a schematic longitudinal sectional view of a potentiometric sensor with a sensor element according to a third exemplary embodiment.

FIG. 5 schematically shows an exemplary embodiment of a potentiometric sensor 101 having a sensor circuit 25, a reference electrode 23, and a sensor element 1 serving as a measuring electrode with an integrated preamplifier 40. The sensor element 1 has a sensor element body 3 surrounding a cavity 41. On an outer side of the sensor element body 3, the sensor element body 3 has an electrically conductive surface 11 which can be formed by a coating of an electrically conductive material. A bore 37 is arranged in the wall of the sensor element body 3 surrounding the cavity 41 through which the electrically conductive surface can be electrically contacted from the cavity 41. An ion-selective glass layer 5 of pH-selective glass serving as a sensor layer is arranged above the electrically conductive surface 11 and is applied by means of a thermal spraying method as described with reference to FIG. 2. The electrically conductive surface 11 contacts the ion-selective glass layer 5 and thus forms a solid terminal lead for a potential forming at the glass layer 5, which is in contact with a measuring liquid. A sheath 9 of an insulating material, for example glass, surrounds at least the interfaces between the ion-selective glass layer 5, the electrically conductive surface 11, and the sensor element body 3 and protects them from penetration by liquid.

The preamplifier 40 is arranged in the cavity 41 within the sensor element body 3. The power supply of the preamplifier 40 (not shown), the reference potential input 42 and the output 43 of the preamplifier 40 are led out of the cavity 41 through the wall of the sensor element body 3. The signal input 44 of the preamplifier 40 is connected to the electrically conductive surface 11 via the contact 7. The power supply and the signal output 43 can be connected to a sensor circuit 25 of the potentiometric sensor 101 which is configured for supplying power to the preamplifier and for detecting measurement signals representing a voltage between the reference electrode 23 and the sensor element 1. The reference potential input 42 is connected to a housing ground or a virtual ground of the power supply.

In an alternative embodiment, the preamplifier can be arranged in the sheath 9. It is advantageous if the preamplifier is arranged as close as possible to the ion-selective glass layer 5.

The invention claimed is:

1. A method of manufacturing an ion-selective sensor element for a potentiometric sensor, wherein the sensor element comprises a sensor element body, the method comprising:
applying a first glass layer to the sensor element body using a thermal spraying method in which a powder of glass particles is sprayed onto the sensor element body, the first glass layer thereby defining a peripheral interface with the sensor element body in an end region therebetween; and
subsequently applying a second glass layer to the sensor element body such that the second glass layer covers the entire peripheral interface between the first glass layer and the sensor element body in the end region, including a surface region of the sensor element body adjoining the peripheral interface and a surface region of the first glass layer adjoining the peripheral interface.

2. The method of claim 1, wherein the first glass layer is an ion-selective glass layer.

3. The method of claim 1, wherein the first glass layer is a pH-selective glass layer.

4. The method of claim 1, wherein the sensor element body includes an electrically conductive surface region, and wherein the first glass layer is applied directly to the electrically conductive surface region.

5. The method of claim 4, wherein the electrically conductive surface region comprises a metal, a metal alloy, a semiconductor, an electrically conductive ceramic, a conductive oxidic material, an organic electrical conductor or an electrically conductive polymer.

6. The method of claim 1, wherein the sensor element comprises an ion-selective layer covering an electrically conductive surface region of the sensor element body, and wherein the second glass layer is a layer of an electrically insulating glass.

7. The method of claim 1, wherein the thermal spraying method is one of the following methods: plasma spraying, wire arc spraying, flame spraying, detonation spraying and laser spraying.

8. The method of claim 1, wherein during the applying of the first glass layer and/or the second glass layer, a partial region of a surface of the sensor element body is covered with a mask.

9. The method of claim 1, wherein the first glass layer and/or the second glass layer are thermally treated after application.

10. The method of claim 9, wherein the thermal treatment is at a temperature between 400° C. and 1000° C.

11. A sensor element manufactured by the method according to claim 1, the senor element comprising:
the sensor element body;
the first glass layer disposed on the sensor element body; and
the second glass layer disposed on the sensor element body, which second glass layer covers the entire peripheral interface between the first glass layer and the sensor element body in the end region.

12. The sensor element of claim 11, wherein the sensor element comprises a preamplifier configured to be connectable to the sensor circuit.

13. The sensor element of claim 12, wherein the preamplifier is disposed in a cavity of the sensor element body or in a housing which at least partially surrounds the sensor element body or a sheath which at least partially surrounds the sensor element body.

14. A method of manufacturing a potentiometric sensor, comprising:
manufacturing an ion-selective sensor element by the method according to claim 1, wherein the sensor element comprises an ion-selective layer and a solid terminal lead contacting the ion-selective layer, wherein the ion-selective layer comprises the first glass layer;
connecting the solid terminal lead to a sensor circuit; and
connecting a reference electrode to the sensor circuit,
wherein the sensor circuit is configured to detect a voltage between the solid terminal lead and the reference electrode and to output a measurement signal that depends on the detected voltage.

15. The method of claim 1, wherein the second glass layer is applied using the thermal spraying method.

16. The method of claim 1, wherein the second glass layer is applied using a different thermal spraying method.

* * * * *